Patented Feb. 20, 1934 1,948,317

UNITED STATES PATENT OFFICE 1,948,317

VULCANIZATION ACCELERATOR

Lorin B. Sebrell and Albert M. Clifford, Akron, Ohio, assignors to Wingfoot Corporation, Wilmington, Del., a corporation of Delaware No Drawing. Application May 4, 1931
Serial No. 535,096

21 Claims. (Cl. 18—53)

It has heretofore been observed that such materials as aniline, the reaction products of aniline and acetaldehyde, thio carbanilid, dithio carbamates, etc., when incorporated into rubber along with the other compounding ingredients, materially increase the rate of cure of the compounds into which they were introduced, thus permitting a reduction in the temperature requisite for obtaining complete vulcanization. It has also been found that many compounds so obtained possess a high degree of resistance to aging and better physical properties than rubber compounds which are vulcanized without the aid of organic accelerators.

Our invention resides in the discovery that secondary aliphatic amines of the type represented by the formula R—NH—X—NH—R:, in which R, R: and X are aliphatic hydrocarbon groups, are powerful vulcanization accelerators which, when employed in most of the ordinary rubber formulæ, result in products possessing superior resistance to age, tensile strength and elasticity. Dibutyl ethylene diamine having the formula:

constitutes a specific example of one compound of this class which has been found to be highly efficient as an accelerator.

This material may readily be prepared by refluxing 2 mols of butyl amine with one mol of ethylene chloride. Care should be taken in conducting the reaction: much heat is given off and in some cases the reaction becomes so violent as to be explosive in character. The reaction may be represented as follows:

2C₄—H₉—NH₂+ClCH₂CH₂Cl→
C₄H₉—NH—CH₂—CH₂—NHC₄H₉2HCl

The hydrochloride of di-butyl ethylene diamine thus obtained is then treated with caustic soda in order to liberate the free base, which may be separated from the resultant mixture by distillation or by gravity.

As an alternative method of preparation, ethylene diamine, together with butyl chloride, may be placed in an autoclave and subjected to a temperature of 140 degrees C. to obtain di-butyl ethylene diamine hydrochloride. This material, like the one described above, should be treated with sodium hydroxide in order to remove the acid molecule.

The resulting material, in either case, has a boiling point of 185 to 187 degrees C. at 3 millimeters of pressure.

In the first described method, a considerable proportion (approximately 25%) of dibutyl piperazine is formed. This material is an oil having a boiling point of approximately 145 to 147 degrees C. at the above indicated pressure. Because of the difference in boiling points of the piperazine from the di-butyl ethylene diamine, they may be separated by distillation. However, separation is unnecessary because the di-butyl piperazine is also an accelerator and small amounts thereof may be retained intermixed with the di-butyl ethylene diamine without appreciable impairment of results.

The di-alkyl substituted diamines are strong bases and readily absorb either water or carbon dioxide to form hydrates or carbamates. Carbon disulfide likewise combines to form a dithio carbamate. All of these latter materials are crystalline substances which, in some cases, are preferred to the original amine because of the ease of handling. The melting point of the hydrate is 40 degrees C. while that of the carbamate is 98 to 99 degrees C., and that of the dithio carbamate is 134 to 136 degrees C.

It is to be understood that the invention is not limited to dibutyl ethylene diamine as an accelerator, but it also includes di-ethyl, di-propyl and di-heptyl substituted ethylene diamines. It is also possible to replace the ethylene group in this type of compound by means of propylene groups, butylene groups or other analogous aliphatic groups.

Any of the amines described may be employed as accelerators of vulcanization in most of the ordinary rubber compounds. However, the following is a specific example of a formula in which they have been found by experience to yield excellent results.

| | Parts |
|---|---|
| Rubber | 100 |
| Zinc oxide | 5 |
| Sulfur | 3 |
| Stearic acid | 1.5 |
| Accelerator | .5 |

In order to test the efficiency of the previously described amines as vulcanization accelerators, they were incorporated into samples of rubber prepared in accordance with the preceding formula and the samples were then subjected to vulcanization for varying periods of time. The results of the tests conducted upon di-butyl ethylene diamine hydrate, di-butyl ethylene diamine carbamate and di-butyl ethylene diamine dithio carbamate are tabulated as follows:

| Cure | | Stress kgs/cm² at | | | Elongation at break |
|---|---|---|---|---|---|
| Time in minutes | Temperature F° | 500% elongation | 700% elongation | Break | |
| Di-butyl ethylene/diamine hydrate | | | | | |
| 20 | 260 | 10 | 24 | 73 | 915 |
| 40 | 260 | 17 | 58 | 142 | 850 |
| 80 | 260 | 29 | 124 | 185 | 765 |
| 60 | 285 | 60 |  | 227 | 680 |
| Di-butyl ethylene diamine carbamate | | | | | |
| 20 | 260 | 8 | 15 | 65 | 980 |
| 40 | 260 | 16 | 54 | 130 | 855 |
| 80 | 260 | 29 | 124 | 175 | 755 |
| 60 | 285 | 55 | 235 | 238 | 705 |
| Di-butyl ethylene diamine dithiocarbamate | | | | | |
| 20 | 260 | 5 | 6 | 12 | 950 |
| 40 | 260 | 6 | 12 | 47 | 955 |
| 80 | 260 | 19 | 62 | 127 | 820 |
| 60 | 285 | 31 | 123 | 174 | 755 |

From the tabulated data, it is apparent that the compounds indicated are powerful vulcanization accelerators producing complete cures within comparatively short periods of time at temperatures of 260 degrees F. (a temperature corresponding to that of steam at 20 pounds pressure). Rubber compounds identical with those above described, but containing no accelerator, are either unvulcanized or only partially vulcanized under such conditions.

The aliphatic amine compounds described may be obtained at relatively small expense by simple chemical reactions which do not involve the use of expensive or complicated apparatus. The compound is also uniform in properties. For that reason, the results obtained by use of a given quantity of accelerator in any particular stock may be determined with a high degree of accuracy. The new materials are thus highly advantageous as commercial accelerators.

Although we have described the preferred form of the invention and have described that form in detail, it will be apparent to those skilled in the art that the invention is not limited thereto but that various modifications may be made therein without departing from the spirit of the invention or from the scope of the appended claims, wherein it is intended to claim all features of patentable novelty inherent in the invention.

What we claim is:

1. A method of treating rubber which comprises subjecting it to vulcanization in the presence of a material having the formula R—NH—X—NH—$R_1$, wherein the groups R, X and $R_1$ are aliphatic hydrocarbon residues, and wherein R and $R_1$ contain not less than two carbon atoms each.

2. A method of treating rubber which comprises subjecting it to vulcanization in the presence of a material having the formula R—NH—X—NH—$R_1$, in which R and $R_1$ represent butyl groups and X represents an aliphatic hydrocarbon group.

3. A method of treating rubber which comprises subjecting it to vulcanization in the presence of a material having the formula R—NH—X—NH—$R_1$, in which R and $R_1$ are aliphatic hydrocarbon groups containing not less than two carbon atoms each and X is an alkylene group.

4. A method of treating rubber which comprises subjecting it to vulcanization in the presence of a material having the formula R—NH—X—NH—$R_1$, in which R and $R_1$ are aliphatic hydrocarbon groups containing not less than two carbon atoms each and X is an ethylene group.

5. A method of treating rubber which comprises subjecting it to vulcanization in the presence of a di-alkyl ethylene diamine, each of the alkyl groups comprising a straight chain containing not less than two carbon atoms.

6. A method of treating rubber which comprises subjecting it to vulcanization in the presence of a di-butyl alkylene diamine.

7. A method of treating rubber which comprises subjecting it to vulcanization in the presence of an addition product of a material having the formula R—NH—X—NH—$R_1$, in which R, $R_1$ and X are aliphatic hydrocarbon groups, the additive group being selected from a class consisting of carbon dioxide and carbon disulphide.

8. A method of treating rubber which comprises subjecting it to vulcanization in the presence of an addition product of dibutyl ethylene diamine, the additive group being selected from a class consisting of carbon dioxide and carbon disulfide.

9. A method of treating rubber which comprises subjecting it to vulcanization in the presence of the carbamate of dibutyl ethylene diamine.

10. A method of treating rubber which comprises subjecting it to vulcanization in the presence of the dithio carbamate of dibutyl ethylene diamine.

11. A method of treating rubber which comprises subjecting it to vulcanization in the presence of di-butyl ethylene diamine.

12. A rubber product that has been vulcanized in the presence of a material having the formula R—NH—X—NH—$R_1$, in which R, $R_1$ and X are aliphatic hydrocarbon groups and in which R and $R_1$ contain not less than two carbon atoms each.

13. A rubber product that has been vulcanized in the presence of a material having the formula R—NH—X—NH—$R_1$, in which R and $R_1$ are butyl groups and X is an aliphatic hydrocarbon group.

14. A rubber product that has been vulcanized in the presence of a material having the formula R—NH—X—NH—$R_1$, in which R and $R_1$ are aliphatic hydrocarbon groups containing not less than two carbon atoms each and X is an ethylene group.

15. A rubber product that has been vulcanized in the presence of an addition product of di-butyl ethylene diamine, the additive materials being selected from a group consisting of carbon dioxide and carbon disulfide.

16. A rubber product that has been vulcanized in the presence of a dialkyl alkylene diamine, the alkyl groups comprising straight chains containing not less than two carbon atoms.

17. A rubber product that has been vulcanized in the presence of dibutyl ethylene diamine.

18. A rubber product that has been vulcanized in the presence of a material selected from a group consisting of dialkyl alkylene diamines in which the alkyl groups comprise straight chains containing not less than two carbon atoms, the carbamates of the dialkyl alkylene diamines and the dithiocarbamates of the dialkyl alkylene diamines.

19. A rubber product that has been vulcanized in the presence of a material having the formula R—NH—X—NH—$R_1$ in which R, $R_1$ and X represent aliphatic hydrocarbon groups having not less than two and no more than four carbon atoms respectively.

20. A rubber product that has been vulcanized in the presence of a dialkyl alkylene diamine, the alkyl groups containing not less than two carbon atoms.

21. A rubber product that has been vulcanized in the presence of a dibutyl alkylene diamine.

LORIN B. SEBRELL.
ALBERT M. CLIFFORD.